United States Patent

Matuyama

[11] Patent Number: 5,663,643
[45] Date of Patent: Sep. 2, 1997

[54] POSITION DETECTING APPARATUS USING OFFSET CALCULATED FROM SUM OF THREE-PHASE SIGNALS

[75] Inventor: Yasuhiko Matuyama, Nagasaki, Japan

[73] Assignee: Sony Magnescale Inc., Tokyo, Japan

[21] Appl. No.: 536,171

[22] Filed: Sep. 29, 1995

[30] Foreign Application Priority Data

Sep. 30, 1994 [JP] Japan .................. 6-237571

[51] Int. Cl.⁶ .............. G01B 7/14; G01D 5/245; G01D 18/00; G01D 3/02
[52] U.S. Cl. .............. 324/207.12; 324/207.24; 324/225
[58] Field of Search ............ 324/207.11, 207.12, 324/207.2, 207.21, 207.24, 207.25, 225

[56] References Cited

U.S. PATENT DOCUMENTS 5,453,684  9/1995  Nakayama .............. 324/207.21

FOREIGN PATENT DOCUMENTS

| 0 588 549 | 3/1994 | European Pat. Off. . |
| 37 40 544 | 8/1989 | Germany . |
| 40 30 946 | 10/1991 | Germany . |
| 92 17 004 | 2/1993 | Germany . |

OTHER PUBLICATIONS

Patent Abstracts Of Japan, vol. 009, No. 265, Oct. 1985, JP-A-60 114714.

Primary Examiner—Walter E. Snow
Attorney, Agent, or Firm—Foley & Lardner

[57] ABSTRACT

A position detecting apparatus for a scale measuring system executes a offset correction of the detected three-phase signals A, B and C by using the arithmetic mean $(A+B+C)/3$ as an offset value. Further, the apparatus executes a gain correction of the offset corrected signals by using a gain which is obtained by the calculation of a square-root of $\{A^2+(B-C)^2/3\}$. Therefore, the accurate measurement is executed by this apparatus even if the gain level is changed at a turn-on of an electric source of this apparatus.

7 Claims, 7 Drawing Sheets

5,663,643

POSITION DETECTING APPARATUS USING OFFSET CALCULATED FROM SUM OF THREE-PHASE SIGNALS

BACKGROUND OF THE INVENTION

1. Field of the Invention

The present invention relates to a position detecting apparatus, and more particularly to an apparatus which generates a high-accuracy position-detective signal by the interpolation of a plurality of detecting signals from a plurality of detection elements.

2. Description of the Related Art

Various position detecting apparatuses have been proposed and in practical use. FIGS. 10 and 11 show a typical position detecting apparatus which detects a position of movable objects. This conventional position detecting apparatus is provided with a measuring scale 901 and a MR sensor 902 which is constituted by three units of magnetic resistance elements. Three-phase signals outputted from the three magnetic resistance elements of the MR sensor 902 are supplied to sampling circuits 906, 907 and 908 through buffer amplifiers 903, 904 and 905, respectively. The sampling circuits 906, 907 and 908 are turned on sequentially so as to supply the analog signals from the buffer amplifiers 903, 904 and 905 to an AD conversion circuit 909 sequentially. The AD conversion circuit 909 converts the analog signals to digital signals and supplies them to a central processing unit (CPU) 910. The CPU 910 executes a calculating operation for obtaining a position of a movable object as to each of the three-phase signals A, B and C.

Next, the manner of this calculating operation will be discussed hereinafter. As shown in FIG. 7, each phase of the three-phase signals A, B and C is shifted from those of the other signals A, B and C by 120°. Assuming that the signal A is standard, the three-phase signals A, B and C can be represented by the following equations $A=G_A \sin\theta$, $B=G_B \sin\{\theta+(2\pi/3)\}$, $C=G_C \sin\{\theta-(2\pi/3)\}$. A cycle period of the signal A can be divided into first to sixth intervals. In the first interval, the amplitude of the signals A, B and C are A>C>B. In the second interval, A>B>C. In the third interval, B>A>C. In the fourth interval, B>C>A. In the fifth interval, C>B>A. In the sixth interval, C>A>B. Therefore, it is possible to distinguish which interval is positioned by the detected signals from the amplitude relationship of the signals A, B and C. When a straight line is drawn on points at each of where two signals are the same in the amplitude, a straight line extending to fight and lower direction is drawn in the first, third and fifth intervals, and a straight line extending to right and upper direction is drawn in the second, fourth and sixth intervals in FIG. 7. FIG. 8 shows an enlarged view of the second interval of FIG. 7. In case that the amplitude of the signals A, B and C is large, the gradient of the line becomes large as shown by a real line in FIG. 8. In case that the amplitude of the signals is small, the gradient of the line becomes small as shown by a broken line in FIG. 8. Therefore, in case of a large gradient, the offset of the phase of the signal is detected as if it takes a small value at a point a with respect to the detection signal v in FIG. 8. Further, in case of small gradient, the offset of the phase of the signal is detected as if it take a large value at a point b in FIG. 8. Therefore, it is difficult to execute a accurate position detection according to the offset amount of the phase of the signal in the above-mentioned situation. As shown in FIG. 9, by multiplying a multiplying factor $(V_{max}-V_{min})/(V_{1max}-V_{1min})$ with the signal v1 so that the amplitude $(V_{1max}-V_{1min})$ is changed to the amplitude $(V_{max}-V_{min})$, the offset amount b of the signal v1 becomes equal to that of the signal v2.

On the basis of this concept, the conventional position detecting apparatus has been arranged so as to detect a maximum value $V_{max}$ and a minimum value $V_{min}$ of the intersections between the phase signals and to obtain a center voltage $(V_{max}+V_{min})/2$, for executing a correction by an offset voltage. Next, the convention position detecting apparatus is arranged to obtain a multiplying factor functioning as a reference amplitude by the calculation of $(V_{max}-V_{min})$ and to correct the signals A, B and C by multiplying the obtained multiplying factor with the detection signal, in order to execute a position detection by means of the corrected signal. Accordingly, this conventional position detecting apparatus is required to detect the previous maximum value $V_{max}$ and minimum value $V_{min}$ of the intersections since this apparatus executes a position detection by detecting an actual amount of the phase offset according to a ratio $(V-V_{min})/(V_{max}-V_{min})$ wherein V is a present detected voltage, $(V-V_{min})$ is a present deviation, and $(V_{max}-V_{min})$ is a maximum deviation.

However, it may happen that the gain level at a turn-on time of an electric source becomes different from the gain lever at a turn-off time due to the change of the position of the measuring scale or deviation of the output of the electric source. If such difference of the gain lever is occurred in the event that the electric source is turned on after the turn-off of it, the accurate detection by this apparatus may be avoided. Further, if this conventional position detecting apparatus employing gage system shown in FIG. 11 is applied to a machine tool or industrial equipment, the position of the measuring scale may further frequently generates a difference between a turn-on time and a turn-off time of the electric source. This generates an error and avoids an accurate position detecting operation of this apparatus.

SUMMARY OF THE INVENTION

It is an object of the present invention to provide an improved position detecting apparatus overcoming the above-mentioned difficulties.

Another object of the present invention is to provides a position detecting apparatus which enables the generation of correct position indicative signal without using previously stored data.

A first aspect of the present invention resides in a position detecting apparatus comprising a sensor which detects a signal recorded on a measuring scale and outputs three-phase signals indicative of the scale recorded signal. An offset value calculating means calculates an offset value by calculating the sum of the three-phase signals and by calculating one-third of the sum of the three-phase signals. A three-phase signal correcting means corrects the three-phase signals by eliminating an output of the offset value calculating means from each of the three-phase signals.

A further aspect of the present invention resides in a position detecting apparatus which is further defined by additional elements. That is, the above position detecting apparatus further comprises a sine-wave signal squaring means which generates a signal indicative of a square of one of the three-phase signals. A cosine-wave signal squaring means includes a subtracter which calculates a difference between the other two of the three-phase signals, a square calculator which calculates a square of an output of the subtracter, and a calculator which derived one-third of an output of the square calculator. A gain calculating means includes an adder which adds an output of the sine-wave signal squaring means and an output of the cosine-wave signal squaring means, and a square-root calculator which calculates a square-root of an output of the adder. A position-information calculating means obtains a signal indicative of position information by correcting an output of the three-phase signals correcting means by an output of the gain calculating means.

DETAILED DESCRIPTION OF THE INVENTION

Figure 1:
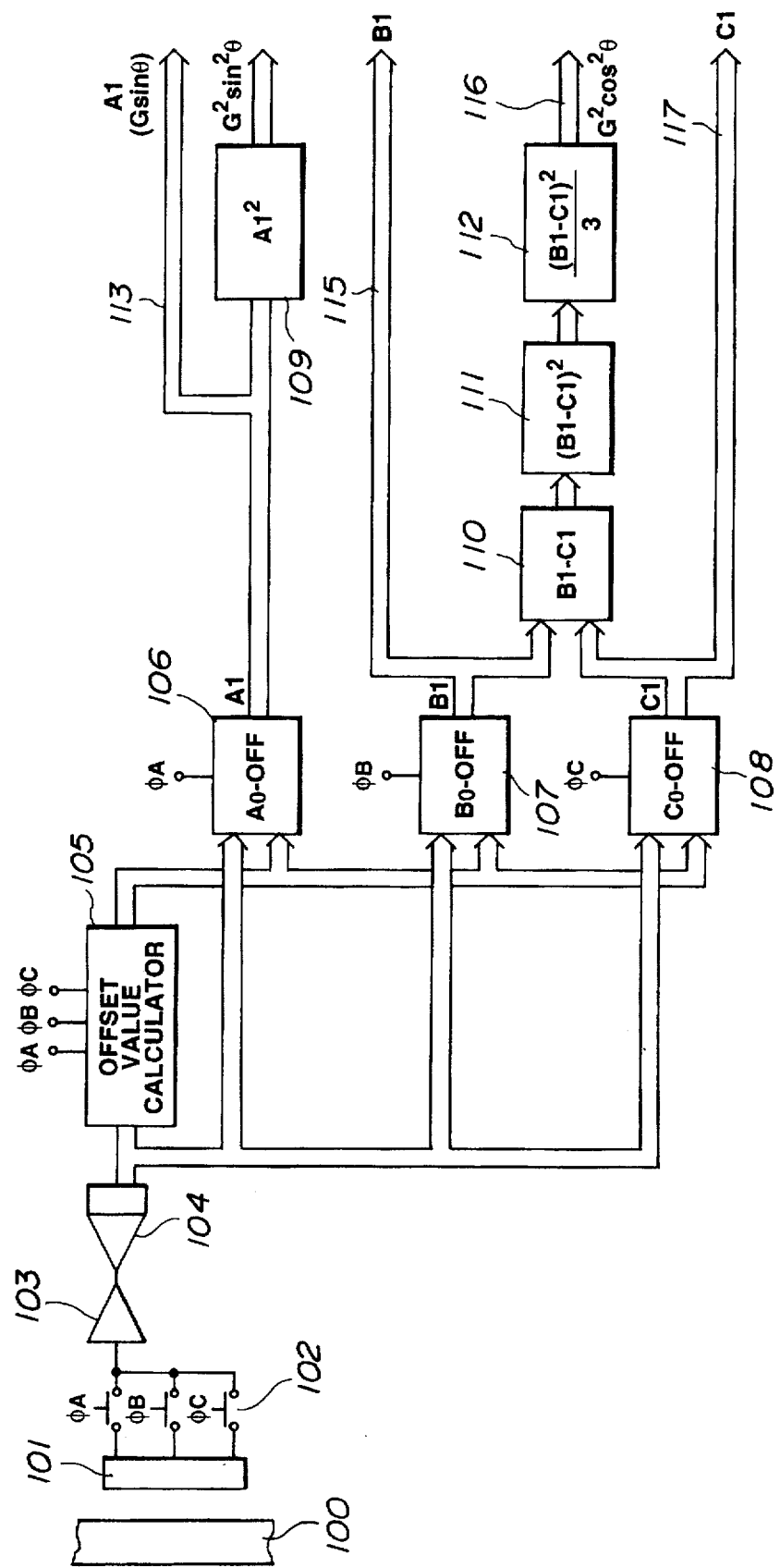
FIG. 1 is a part of a circuit diagram of an embodiment of a position detecting apparatus according to the present invention.

Referring to the drawings, there are shown embodiments of a position detecting apparatus according to the present invention.

First, a theoretical explanation as to a method for eliminating a detection error in the position detecting apparatus according to the present invention will be discussed hereinafter.

Assuming that three-phase signals A, B and C detected by detection elements have gains $G_A$, $G_B$ and $G_C$ and offset values $A_{OFF}$, $B_{OFF}$ and $C_{OFF}$, respectively, the three-phase signals A, B and C may be represented as follows:

$$A = G_A \sin\theta + A_{OFF}$$

$$B = G_B \sin\{\theta + (2\pi/3)\} + B_{OFF}$$

$$C = G_C \sin\{\theta - (2\pi/3)\} + C_{OFF}$$

Normally, the gains $G_A$, $G_B$ and $G_C$ are set to have the same amplitude and tend to be simultaneously changed according to an external condition. That is, the gains $G_A$, $G_B$ and $G_C$ tend to be changed as follows. When the gain $G_A$ is increased, the gains $G_B$ and $G_C$ are increased, and when the gain $G_A$ is decreased, the gains $G_B$ and $G_C$ are decreased. Accordingly, it may be assumed that $G_A = G_B = G_C$.

Further, from the relationship of the trigonometric function $\sin x + \sin y = 2\sin\{(x+y)/2\}\cos\{(x-y)/2\}$, the sum of the three-phase signals A, B and C can be represented by the following equation.

$$G_A \sin\theta + A_{OFF} + G_B \sin\{\theta + (2\pi/3)\} + B_{OFF} + \quad (1)$$
$$G_C \sin\{\theta - (2\pi/3)\} + C_{OFF} =$$
$$G_A[\sin\theta + \sin\{\theta + (2\pi/3)\} + \sin\{\theta - (2\pi/3)\}] + A_{OFF} + B_{OFF} + C_{OFF} =$$
$$A_{OFF} + B_{OFF} + C_{OFF}$$

Therefore, the sum of the three-phase signals A, B and C becomes equal to the sum of the offset values $A_{OFF}$, $B_{OFF}$ and $C_{OFF}$ of the three-phase signals A, B and C.

Since it may be assumed that the offset values of the respective signals A, B and C generally receive the same effect according to the external condition, by setting the offset value as follows:

$$A_{OFF} = B_{OFF} = C_{OFF} = D_{OFF},$$

the sum of the offset values of the respective three-phase signals A, B and C can be represented as follows:

$$A_{OFF} + B_{OFF} + C_{OFF} = 3D_{OFF}$$

Therefore, an offset value $D_{OFF}$ of each signal A, B, C can be obtained by dividing the obtained value $3D_{OFF}$ by 3.

As to the gain, by using a proper value $G_0$, which is not equal to zero, as a standard gain, and by comparing the present gain G with the standard gain $G_0$, it becomes possible to adjust the gain.

Assuming that the gain G of the three-phase signals A, B and C satisfies $G_A = G_B = G_C = G$, the difference between the signals B and C is obtained as follows:

$$B - C = G\sin\{\theta + (2\pi/3)\} - G\sin\{\theta - (2\pi/3)\} \quad (2)$$
$$= 2G\cos\theta\sin(2\pi/3) = +\sqrt{3}\ G\cos\theta$$

Therefore, the present gain G can be obtained from the following equation:

$$G^2\sin^2\theta + 3G^2\cos^2\theta/3 = G^2 \quad (3)$$

That is, by adding the square of the signal $A = G\sin\theta$ and one-third of the square of the value $\sqrt{3}G\cos\theta$ of the equation (2), and by further obtaining the square-root of the sum $G^2$, the present gain G is obtained.

Figure 8:
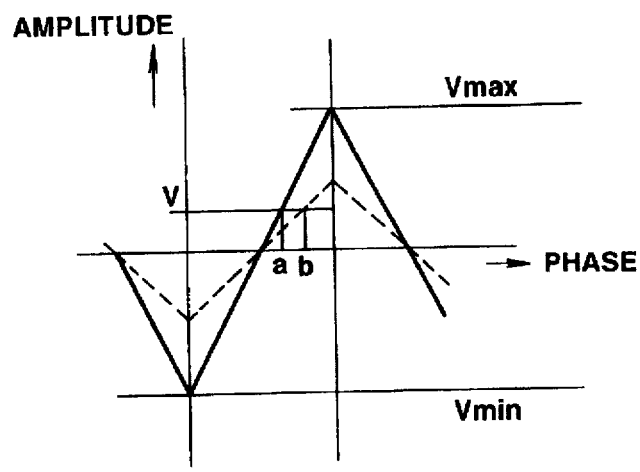
FIG. 8 is a graph which shows a gain characteristic of the three-phase signals.
Figure 9:
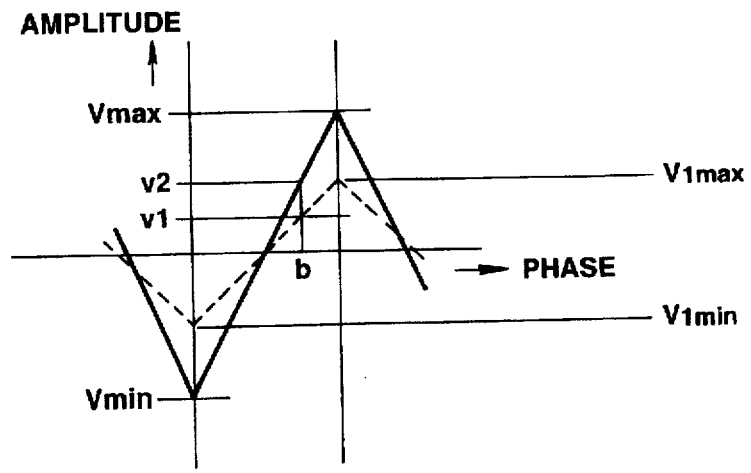
FIG. 9 is another graph which shows a gain characteristic of the three-phase signals.
Figure 10:
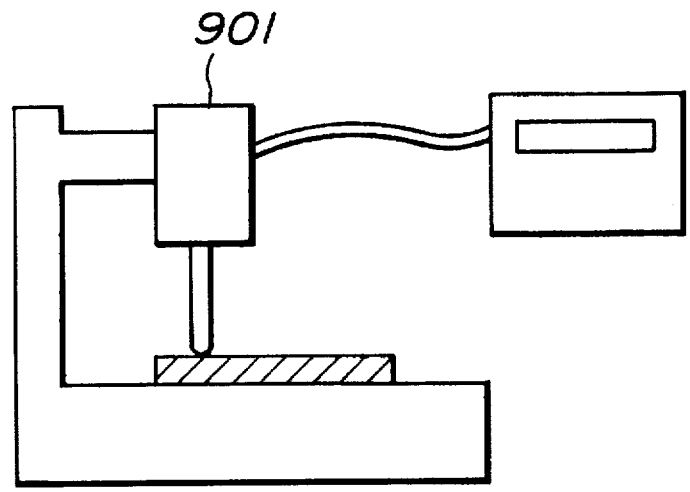
FIG. 10 is a schematic view of a conventional position detecting apparatus.
Figure 11:
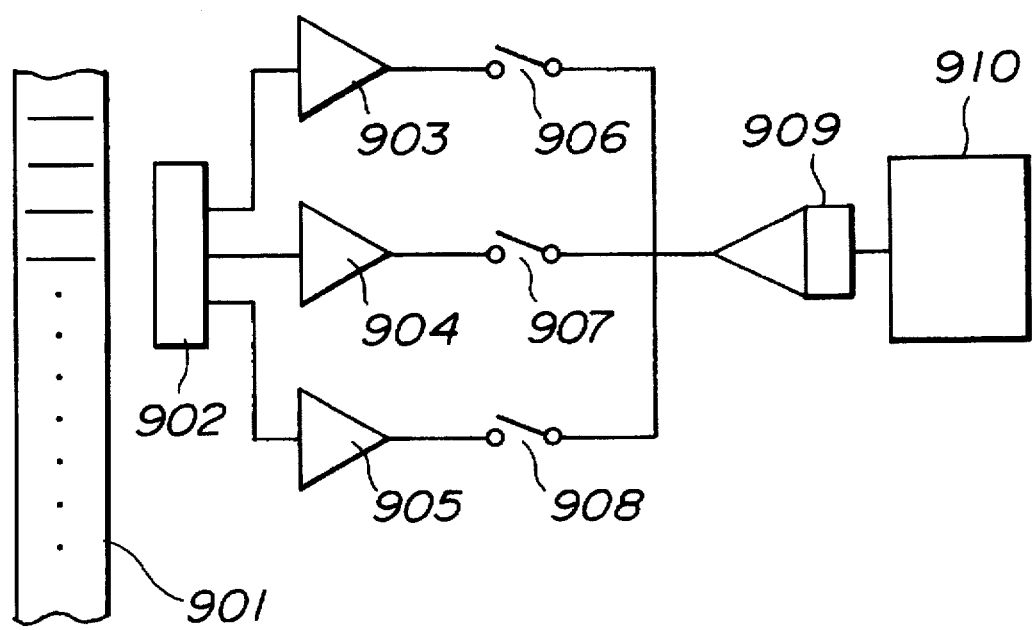
FIG. 11 is a circuit diagram which shows the conventional position detecting apparatus.

From the obtained offset value $D_{OFF}$ and the present gain G, the values $V_{max}$ and $V_{min}$, which indicate characteristics of the chopping wave shown in FIGS. 8 and 9, can be obtained as follows:

$$V_{max} = G/2 + D_{OFF}$$

$$V_{min} = -G/2 + D_{OFF}$$

Referring to FIG. 1, there is shown a first embodiment of the position detecting apparatus based on the above-mentioned method according to the present invention. This position detecting apparatus is of a digital signal processing type.

The position detecting apparatus comprises a sensor 101 which detects a position read-on signals from a measuring scale 100. The read-on signals are picked up through a switch unit 102 as three-phase signals. The three-phase signals are analog signals whose phases are offset with each other by 120°. The analog signals are supplied to an A/D converter 104 through an amplifier 103.

An output from the A/D converter 104 is supplied to an offset value calculator 105 wherein an offset value of the three-phase signals A, B and C are calculated by adding the signals $A_0$, $B_0$ and $C_0$ and dividing the sum of them by 3.

The calculated offset value is supplied to subtracters 106, 107 and 108. Further, the signals $A_0$, $B_0$ and $C_0$ are supplied to the subtracters 106, 107 and 108, respectively. Each of the subtracters 106, 107 and 108 calculates a difference between the signal $A_0$, $B_0$, $C_0$ and the offset value. These calculations at the subtracters 106, 107 and 108 correspond to a correction of the detected three-phase signals as to the offset value. If the offset value inputted to the subtracters 106, 107 and 108 takes a minus value, the substracters 106, 107 and 108 execute adding operation.

Therefore, output ends 113, 115 and 117 output signals A1, B1 and C1, respectively, from which the offset value has been eliminated. The output A1 of the subtracter 106 is supplied to a square calculator 109 wherein $G^2\sin^2\theta$ is generated. The generated value $G^2\sin^2\theta$ is outputted to an output end 114. The outputs B1 and C1 from the subtracters 107 and 108 are supplied to a subtracter 110 where the difference (B1–C1) is calculated. The output of the subtracter 110 is supplied to a square calculator 111 where (B1–C1)$^2$ is obtained. The calculated value (B1–C1)$^2$ is supplied to a divider 112 where (B1–C1)$^2$/3 is obtained by dividing (B1–C1)$^2$ by 3. The calculated value (B1–C1)$^2$/3 is outputted to an output end 116. It will be understood that the divider 112 may be replaced by a multiplier which multiplies the value (B1–C1)$^2$ with $\frac{1}{3}$ (0.33).

Figure 2:
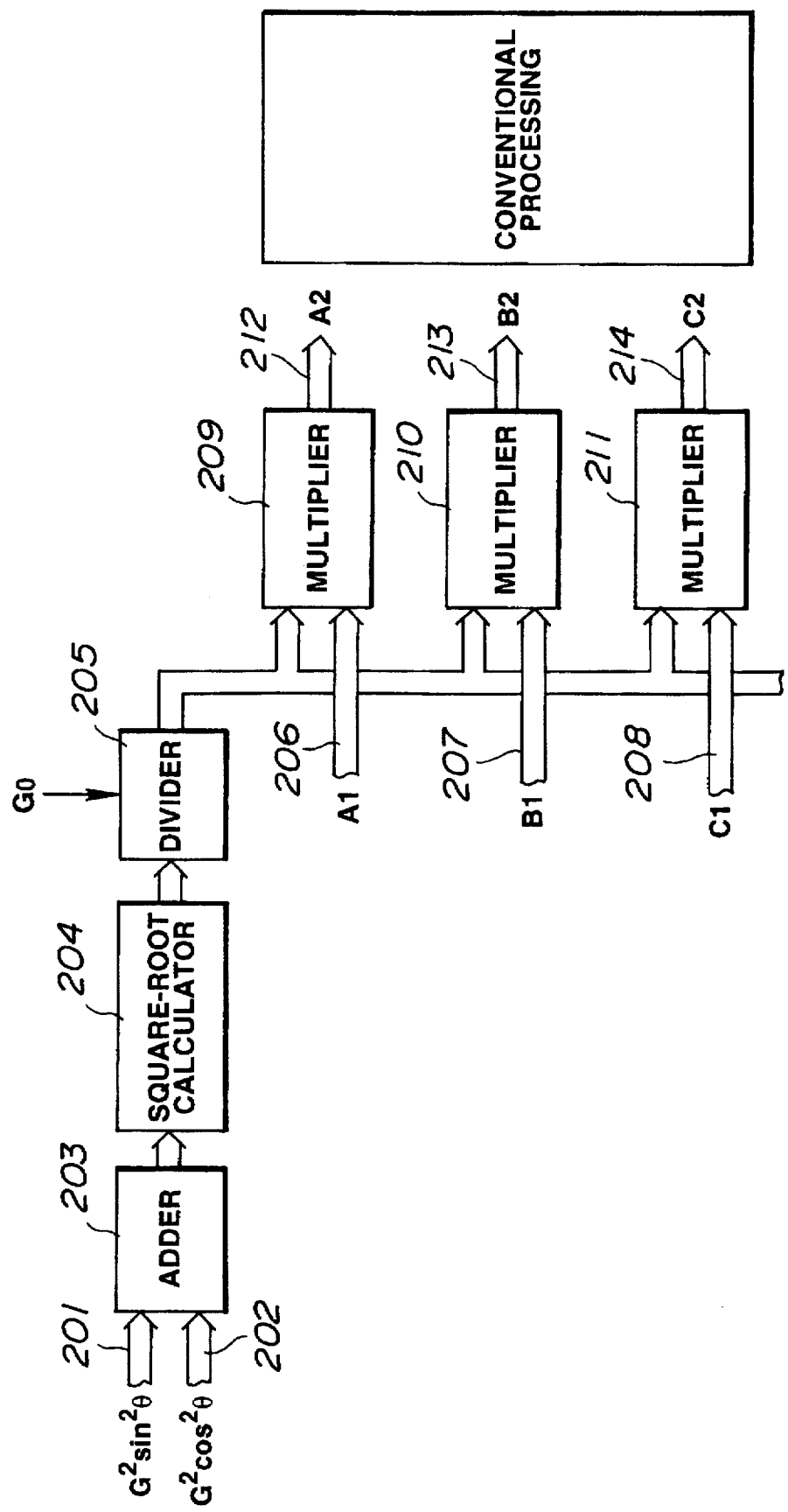
FIG. 2 is another part of a circuit diagram of an embodiment of a position detecting apparatus according to the present invention.

The signal $G^2\sin^2\theta$ outputted to the output end 114 and the signal $G^2\cos^2\theta$ outputted to the output end 116 are supplied to input ends 210 and 202, respectively, as shown in FIG. 2. An adder 203 receives the signals $G^2\sin^2\theta$ and $G^2\cos^2\theta$ and obtains $G^2$ as is clear from the formula $G^2\sin^2\theta+G^2\cos^2\theta=G^2$.

The output $G^2$ of the adder 203 is inputted into a square-root calculator 204 wherein G is obtained by calculating a square-root of $G^2$. The value G represents the above-mentioned gain and is supplied to a divider 205 wherein a gain ratio $G_0/G$ is obtained. One input end of each multiplier 209, 210, 211 receives the signal A1, B1, C1. Another input end of each multiplier 209, 210, 211 receives the gain ratio $G/G_0$ from the divider 205. The multipliers 209, 210 and 211 outputs signals A2, B2 and C2 which have been corrected by the present gain. Therefore, it becomes possible to execute an accurate position detection based on the phase $\theta$ of the signals.

Figure 3:
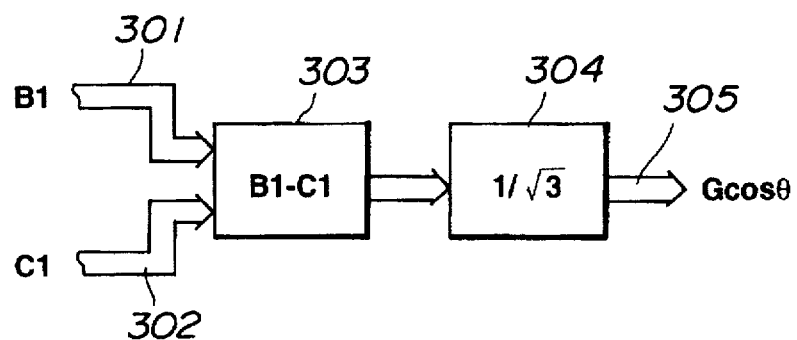
FIG. 3 is a circuit diagram of a sine-curve calculating circuit which is applicable to the position detecting apparatus according to the present invention.

FIG. 3 shows a position detecting circuit which generates a difference signal (B1–C1) at a subtracter 303 from the signals B1 and C1. Since the difference signal (B1–C1) is corresponding to $\sqrt{3}G\cos\theta$ as is clear from the equation (2), by multiplying $1/\sqrt{3}$ with the difference signal (B1–C1) at a multiplier 304, $G\cos\theta$ is obtained. By using a signal $G\cos\theta$ of an output end 305 and the signal $G\sin\theta$ of the output end 113, a signal $\theta$ indicative of a position information is obtained ($\theta=\tan^{-1}(\sin\theta/\cos\theta)$).

Although the explanation of the position detecting apparatus employing a digital signal processing has been described hereinabove, it is possible to apply this method according to the present invention to a position detecting apparatus employing an analog signal processing.

Figure 5:
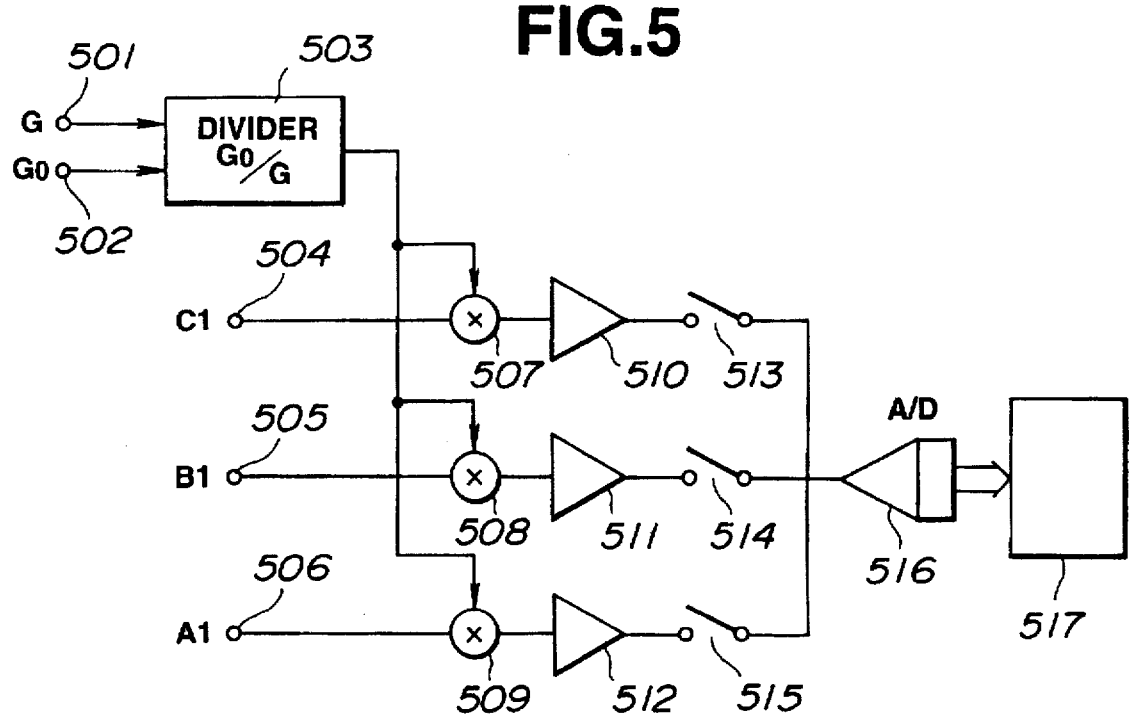
FIG. 5 is another part of a circuit diagram of a second embodiment of the position detecting apparatus according to the present invention.
Figure 4:
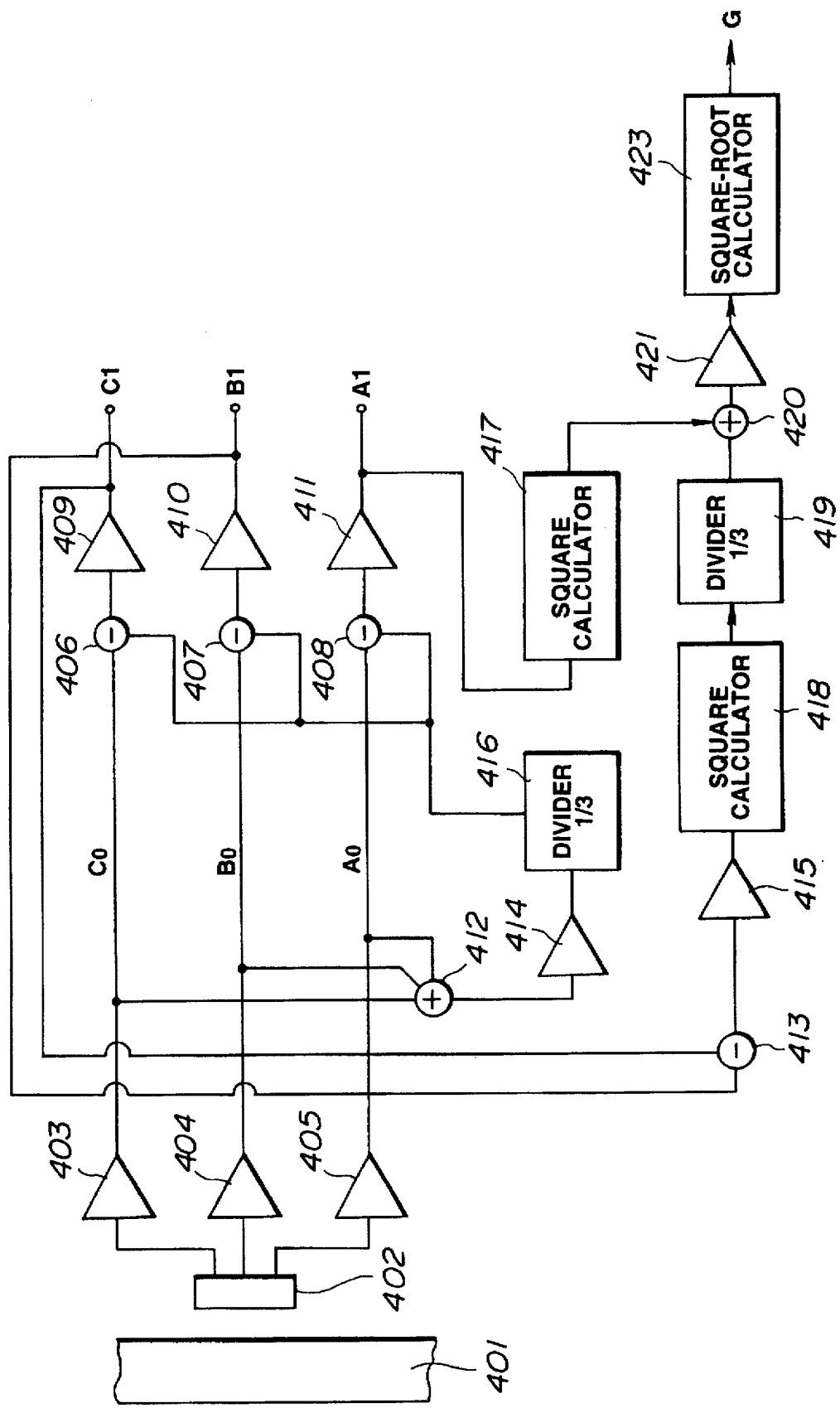
FIG. 4 is a part of a circuit diagram of a second embodiment of the position detecting apparatus according to the present invention.

Referring to FIGS. 4 and 5, there is shown a second embodiment of the position detecting apparatus according to the present invention. The position detecting apparatus is an analog-signal processing type.

In FIG. 4, a measuring scale 401 and a sensor 402 are positioned so as to be relatively movable, that is, one of them is installed at a fixed position, and the other one is installed at a movable object. The sensor 402 detects three-phase signals $A_0$, $B_0$ and $C_0$ whose phases are shifted by 120° with each other. The three-phase signals $A_0$, $B_0$ and $C_0$ are sent to amplifiers 403, 404 and 405, respectively, and their gains are adjusted (controlled). The output signals from the amplifier 403, 404 and 405 are added at an adder 412 to form a signal indicative of the sum $(A_0+B_0+C_0)$. The signal indicative of the sum is supplied to a divider 416 through an amplifier 414. The signal indicative of the sum $(A_0+B_0+C_0)$ can be represented by the sum $3D_{OFF}$ of the respective offset values as shown by the equation (1). Therefore, by dividing the sum $(A_0+B_0+C_0)$ by 3 at the divider 414, the signal indicative of the offset value $D_{OFF}$ is derived.

The signals $A_0$, $B_0$ and $C_0$ outputted from the respective amplifiers 403, 404 and 405 are sent to subtracters 406, 407 and 408, respectively so that offset eliminated signals are obtained by the subtraction of the offset value $D_{OFF}$ of the divider 416 from the inputted signals $A_0$, $B_0$ and $C_0$. Output signals from subtracters 406, 407 and 408 are inputted to amplifiers 409, 410 and 411, respectively, and offset eliminated signals $A_1$, $B_1$ and $C_1$, from which offset has been eliminated, are outputted therefrom.

The signal $C_1$ from the amplifier 409 and the signal $B_1$ from the amplifier 410 are inputted to a subtracter 413 where a difference signal $(B_1-C_1)$ is calculated and outputted. The signal outputted from the subtracter 413 is a signal from which an offset has been eliminated and which includes a value $\sqrt{3}G\cos\theta$ derived from the equation (2). Further, the output signals $C_0$ and $B_0$ from the amplifiers 403 and 404 may be used instead of the output signals $C_1$ and $B_1$ from the amplifiers 409 and 410.

A square calculating block 418 calculates the square of the signal $\sqrt{3}G\cos\theta$ and outputs a signal indicative of $3G^2\cos^2\theta$. The output of the square calculating block 418 is supplied to a divider (or multiplier) 419 wherein the signal indicative of $3G^2\cos^2\theta$ is divided by 3 (or multiplied by $\frac{1}{3}$), and a signal indicative of $G^2\cos^2\theta$ is outputted.

On the other hand, a signal indicative of $A_1=G\sin\theta$ outputted from the amplifier 411 is squared at a square calculating block 417. Therefore, by adding the output of the square calculating block 417 and the output of the divider 419, $G^2=G^2\sin^2\theta+G^2\cos^2\theta$ is obtained at an adder 420. Further, the signal indicative of $G^2$ is inputted through an amplifier 421 to a square-root calculating block 423 where the square-root of the inputted value is calculated. the signal indicative of G is outputted from the square-root calculating block 423.

The obtained value G represents a gain and is a parameter relating to the amplitude of the respective three-phase signals $A_1$, $B_1$ and $C_1$. As is clear from the above explanation of FIG. 8, when the gain G is larger than a predetermined value, it is necessary to increase the value of the signal in proportion to the increase of the gain G to obtain correct position information. Therefore, the following gain correction is executed.

FIG. 5 shows a circuit for executing a gain correction. The present gain G and the standard gain $G_0$ are inputted to a divider 503 wherein the gain ratio $G_0/G$ is calculated. The output of the divider 503 is inputted to the respective multipliers 507, 508 and 509 where the signals indicative of $C_1$, $B_1$ and $A_1$ is multiplied with the ratio $G_0/G$, respectively, in order to correct the amplitudes of the signals indicative of $C_1$, $B_1$ and $A_1$ according to the gain ratio.

The corrected signals are supplied to the switches 513, 514 and 515 through amplifiers 510, 511 and 512, respectively. According to the sequential switching operation of the respective -switches 515, 514 and 513, the signals are supplied to an A/D converter 516 where the inputted signals are converted into digital signals. Further, the converted digital signals are inputted to a later circuit 517 which has been used in a conventional position detecting apparatus.

Although in the above-explanation, the standard gain $G_0$ has been properly determined, it is further preferable to store the maximum value and the minimum value of the standard gain $G_0$ at a previous turning-off of the electric source by means of EEPROM or NVRAM in order to be applicable to such a case that the offset values and gains with respect to the signals A, B and C are largely dispersed. Also, the maximum value and the minimum value read from the sensor at an initial setting period may be stored in a memory.

Figure 6:
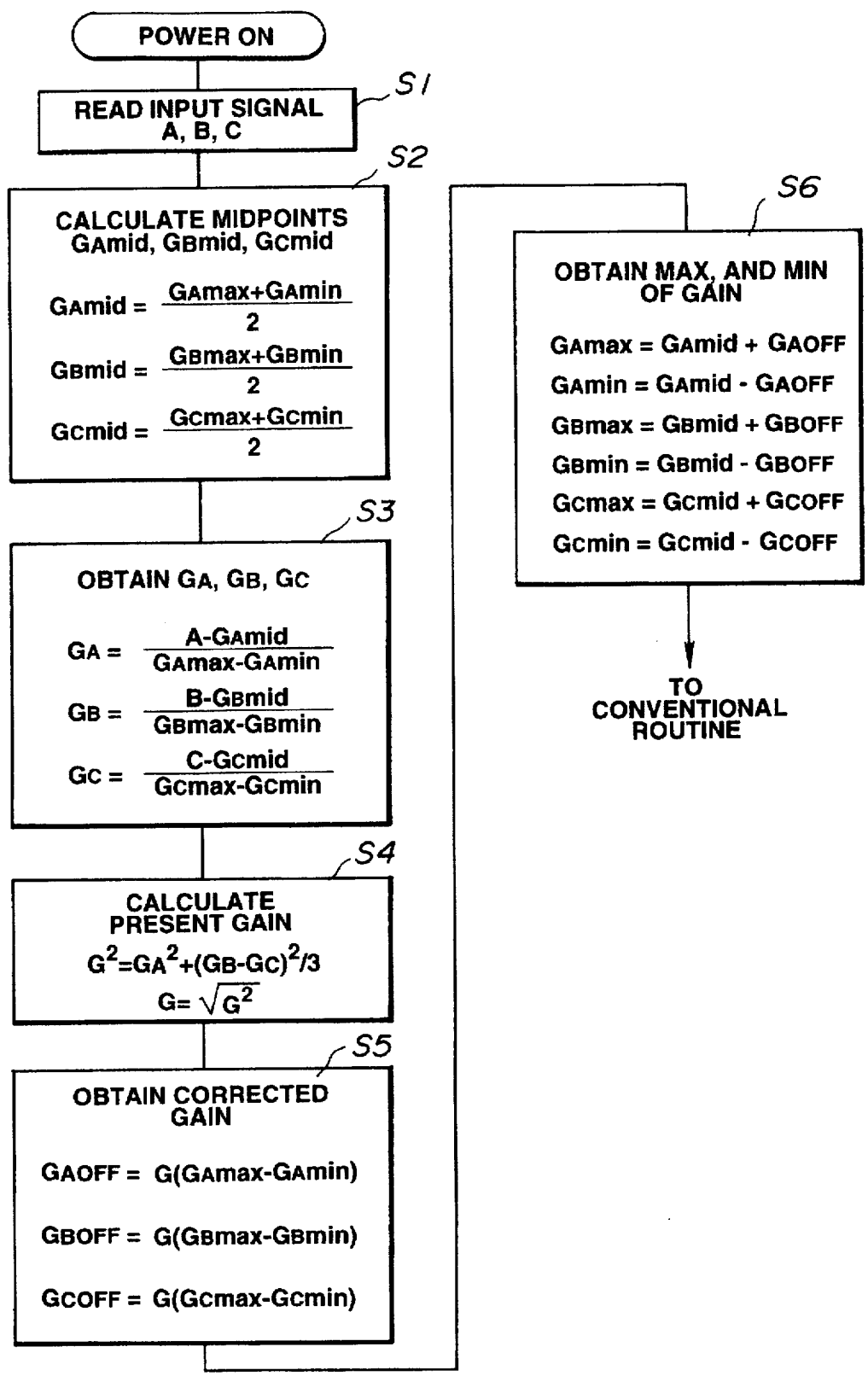
FIG. 6 is a flowchart which shows a procedure for calculating the offset value and the gain on the basis of the stored data.
Figure 7:
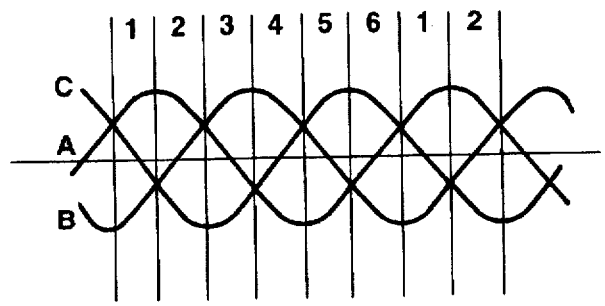
FIG. 7 is a wave-form view which shows divided intervals in a cycle period of three-phase signals.

With reference to a flowchart of FIG. 6, the manner of operation of the gain control, which control is executed at a turning-on of the electric source based on data stored in the memory, will be discussed hereinafter.

First, it is assumed that the respective maximum and minimum values of input signals A, B and C are $G_{Amax}$, $G_{Amin}$; $G_{Bmax}$, $G_{Bmin}$; $G_{Cmax}$, $G_{Cmin}$.

By turning-on the electric source, the gain control operation is started.

In a step S1, the respective input signals A, B and C are read-in from the sensor.

In a step S2, a midpoint of each input signal A, B, C is calculated according to the stored maximum and minimum values $G_{Amax}$, $G_{Amin}$; $G_{Bmax}$, $G_{Bmin}$; $G_{Cmax}$, $G_{Cmin}$. That is, the midpoints of the respective input signals A, B and C are calculated from the following equations:

$$G_{Amid} = (G_{Amax} + G_{Amin})/2$$

$$G_{Bmid} = (G_{Bmax} + G_{Bmin})/2$$

$$G_{Cmid} = (G_{Cmax} + G_{Cmin})/2$$

wherein $G_{Amid}$ is a midpoint of the input signal A, $G_{Bmid}$ is a midpoint of the input signal B, and $G_{Cmid}$ is a midpoint of the input signal C.

In a step S3, differences $(A-G_{Amid})$, $(B-G_{Bmid})$, $(C-G_{Cmid})$ between the signals A, B and C and the midpoints $G_{Amid}$, $G_{Bmid}$ and $G_{Cmid}$ are calculated, then the respective gains are calculated from the following equations:

$$G_A = (A-G_{Amid})/(G_{Amax}-G_{Amin})$$

$$G_B = (B-G_{Bmid})/(G_{Bmax}-G_{Bmin})$$

$$G_C = (C-G_{Cmid})/(G_{Cmax}-G_{Cmin})$$

In a step S4, the present gain G is calculated from the following equation:

$$G_A = G\sin\theta,\ G_B = G\sin\{\theta+(2\pi/3)\},\ G_C = G\sin\{\theta-(2\pi/3)\}$$

$$G_A^2 + \{(G_B-G_C)^2/3\} = G^2$$

Then, the square root of $G^2$ is calculated.

In a step S5, the gain amplitude is obtained by correcting the maximum amplitude of a previously stored value by the present gain G. That is, the calculation of the following equations is executed.

$$G_{AOFF} = G(G_{Amax}-G_{Amin})$$

$$G_{BOFF} = G(G_{Bmax}-G_{Bmin})$$

$$G_{COFF} = G(G_{Cmax}-G_{Cmin})$$

In a step S6, the present maximum gain and minimum gain are calculated from the midpoints $G_{Amid}$, $G_{Bmid}$ and $G_{Cmid}$ and the gain amplitudes $G_{AOFF}$, $G_{BOFF}$ and $G_{COFF}$. That is, the calculation of the following equations is executed.

$$G_{Amax} = G_{Amid} + G_{AOFF}$$

$$G_{Amin} = G_{Amid} - G_{AOFF}$$

$$G_{Bmax} = G_{Bmid} + G_{BOFF}$$

$$G_{Bmin} = G_{Bmid} - G_{BOFF}$$

$$G_{Cmax} = G_{Cmid} + G_{COFF}$$

$$G_{Cmin} = G_{Cmid} - G_{COFF}$$

Following this calculation of the maximum and minimum gains of each three-phase signal A, B, C, the conventional scale measurement procedure is executed by using the obtained maximum and minimum gains.

With this arranged position detecting apparatus according to the present invention, even if the gain is changed by the turning-on of the electric power source, the position detection is accurately executed. Further, even if the gain is changed due to the thermal and/or machinery effect, the accurate detection is executed by correcting the obtained data.

While the invention has been shown and described with reference to preferred embodiments thereof, it will be understood by those skilled in the art that the foregoing and other changes in form and details can be made therein without departing from the spirit and scope of the invention.

What is claimed is:

1. A position detecting apparatus comprising:

a measuring scale;

a sensor detecting a signal recorded on said measuring scale and outputting three-phase signals indicative of the scale recorded signal;

means for calculating an offset value by calculating the sum of the three-phase signals and by calculating one-third of the sum of the three-phase signals; and means for correcting each of the three-phase signals by eliminating an output of said offset value calculating means from each of the three-phase signals.

2. A position detecting apparatus comprising:

a measuring scale;

a sensor detecting a signal recorded on said measuring scale and outputting three-phase signals indicative of the scale recorded signal;

means for calculating an offset value by calculating the sum of the three-phase signals and by calculating one-third of the sum of the three-phase signals;

means for correcting each of the three-phase signals by eliminating an output of said offset value calculating means from each of the three-phase signals;

a sine-wave signal squaring means for generating a signal indicative of a square of one of the three-phase signals;

a cosine-wave signal squaring means including a subtracter which calculates a difference between the other two of the three-phase signals, a square calculator which calculates a square of an output of the subtracter, and a calculator which derives one-third of an output of the square calculator;

a gain calculating means including an adder which adds an output of said sine-wave signal squaring means and an output of said cosine-wave signal squaring means and a square-root calculator which calculates a square-root of an output of the adder; and a position-information calculating means for obtaining a signal indicative of position information by correcting an output of said three-phase signals correcting means by an output of said gain calculating means.

3. A position detecting apparatus as claimed in claim 2, wherein a ratio between a present gain and a standard gain is obtained, the amplitude of each of the three-phase signals being corrected by the ratio before obtaining the position information.

4. A position detecting apparatus as claimed in claim 1, wherein the calculation of the sum of the three-phase signals in said offset value calculating means is executed by one of a multiplier and a divider, the elimination of the offset value from each of the three-phase signals in said correcting means being executed by one of an adder and a subtracter.

5. A position detecting apparatus as claimed in claim 2, wherein the calculator of said cosine-wave signal squaring means includes one of a multiplier and a divider.

6. A position detecting method for a measuring scale, comprising the steps of:
   a) detecting a signal recorded on said measuring scale;
   b) determining and outputting three phase-offset signals indicative of the detected signal;
   c) calculating a sum of the three phase-offset signals in order to obtain a summed signal;
   d) calculating one-third of the summed signal in order to obtain an offset value; and
   e) correcting each of the three phase-offset signals by eliminating the offset value from each of the three phase-offset signals.

7. A position detecting method as claimed in claim 6, further comprising the steps of:
   f) squaring one of the three phase-offset signals in order to obtain a squared signal;
   g) calculating a difference between the other two of the three phase-offset signals in order to obtain a difference signal;
   h) squaring the difference signal in order to obtain a squared difference signal;
   i) calculating one-third of the squared difference signal in order to obtain a divided signal;
   j) adding the divided signal and the square signal in order to obtain an added signal;
   k) calculating a square root of the added signal in order to obtain a square root signal; and
   l) determining position information of the measuring scale by correcting the three phase-offset signals by a value corresponding to the square root signal.

* * * * *